United States Patent
Listyg et al.

(10) Patent No.: US 11,651,141 B2
(45) Date of Patent: May 16, 2023

(54) AUTOMATED GENERATION OF RELATED SUBJECT MATTER FOOTER LINKS AND PREVIOUSLY ANSWERED QUESTIONS

(71) Applicant: Wyzant, Inc., Chicago, IL (US)

(72) Inventors: Benjamin Listyg, Marietta, GA (US); Edward Corcoran, Chicago, IL (US); Michael Angellotti, Chicago, IL (US); Brent Zajaczkowski, Chicago, IL (US); Jonathan Gostelow, Chicago, IL (US); Jorel Casal, Chicago, IL (US); David Jaress, Chicago, IL (US)

(73) Assignee: Wyzant, Inc., Chicago, IL (US)

(*) Notice: Subject to any disclaimer, the term of this patent is extended or adjusted under 35 U.S.C. 154(b) by 45 days.

(21) Appl. No.: 16/446,117

(22) Filed: Jun. 19, 2019

(65) Prior Publication Data

US 2020/0401655 A1    Dec. 24, 2020

(51) Int. Cl.
*G06F 40/134* (2020.01)
*G06F 40/205* (2020.01)
*G06F 40/166* (2020.01)
*G06F 40/169* (2020.01)
*G06Q 50/20* (2012.01)

(52) U.S. Cl.
CPC .......... *G06F 40/134* (2020.01); *G06F 40/166* (2020.01); *G06F 40/169* (2020.01); *G06F 40/205* (2020.01); *G06Q 50/20* (2013.01)

(58) Field of Classification Search
CPC .... G06F 40/134; G06F 40/166; G06F 40/169; G06F 40/205; G06Q 50/20
See application file for complete search history.

(56) References Cited

U.S. PATENT DOCUMENTS

| | | | |
|---|---|---|---|
| 6,125,340 A * | 9/2000 | Miles | G06N 7/005 |
| | | | 702/181 |
| 6,199,071 B1 * | 3/2001 | Nielsen | G06F 16/9558 |
| 8,135,706 B2 | 3/2012 | Yu | |
| 8,312,022 B2 | 11/2012 | Wilde | |
| 9,659,095 B2 | 5/2017 | Kini | |

(Continued)

OTHER PUBLICATIONS

Mikolov, Efficient Estimation of Word Representation in Vector Space, Sep. 7, 2013, US.

(Continued)

*Primary Examiner* — Asher D Kells
(74) *Attorney, Agent, or Firm* — Baker & McKenzie

(57) ABSTRACT

A system and method for utilizing automatically generating related subject matter areas to create footer links for a subject matter page of a tutor matching website is disclosed and claimed. In particular, a document embedding algorithm such as word2vec, doc2vec or GloVe can be trained using on a particular subject using pertinent material such as, for example, textbooks, learned papers, and transcripts of lectures. Once trained, the document embedding algorithm can be used to generate a list of related subjects that can be used to automatically build footer links for a particular subject matter page. The related footer links can improve the positioning of the tutor matching website with common Internet search engines. The same document embedding algorithm can be used to identify previously answered questions that may assist a user posing a question to the tutor matching website.

12 Claims, 13 Drawing Sheets

(56) References Cited

U.S. PATENT DOCUMENTS

| | | | |
|---|---|---|---|
| 9,798,820 B1 | 10/2017 | Premont-Schwarz | |
| 11,194,963 B1* | 12/2021 | Schafer | G06N 20/00 |
| 2006/0026593 A1* | 2/2006 | Canning | G06F 9/4843 |
| | | | 718/100 |
| 2006/0047639 A1* | 3/2006 | King | G06V 30/1444 |
| 2006/0064394 A1* | 3/2006 | Dettinger | G06F 16/382 |
| 2007/0073748 A1* | 3/2007 | Barney | G06F 16/334 |
| | | | 707/E17.093 |
| 2008/0077574 A1* | 3/2008 | Gross | G06Q 30/0269 |
| 2012/0016857 A1 | 1/2012 | Gross | |
| 2012/0072422 A1* | 3/2012 | Rollins | G06F 40/258 |
| | | | 707/737 |
| 2015/0234813 A1* | 8/2015 | Knapp | G06F 16/248 |
| | | | 707/722 |
| 2016/0042654 A1* | 2/2016 | Fieldman | G09B 7/00 |
| | | | 434/219 |
| 2016/0098477 A1* | 4/2016 | Berajawala | G06F 3/0482 |
| | | | 707/727 |
| 2016/0125751 A1* | 5/2016 | Barker | G06F 16/284 |
| | | | 434/322 |
| 2016/0217343 A1* | 7/2016 | Hoffman | G06F 40/30 |
| 2017/0031894 A1* | 2/2017 | Bettersworth | G06F 40/205 |
| 2017/0161279 A1* | 6/2017 | Franceschini | G06F 16/93 |
| 2018/0032874 A1* | 2/2018 | Sanchez Charles | G06F 16/367 |

OTHER PUBLICATIONS

Le, Distributed Representations of Sentences and Documents, May 22, 2014, US.
Pennington, GloVe: Global Vectors for Word Representation, Computer Science Department, Stanford University, 2014.

* cited by examiner

| INPUT SUBJECT MATTER | RELATED SUBJECTS |
|---|---|
| QUANTUM MECHANICS | AP CHEMISTRY TUTORS, POWERFUL NUMBER TUTORS, BOND-LINE STRUCTURES TUTORS, THEORETICAL ASTROPHYSICS TUTORS, SOIL MECHANICS TUTORS, MECHANICAL ENGINEERING TUTORS, ELECTRICITY TUTORS, DOT STRUCTURES TUTORS, ATOMIC MASS TUTORS, SUPERPOSITION OF WAVES TUTORS, ELECTRICAL ENGINEERING TUTORS, COMPUTATIONAL COMPLEXITY TUTORS, CONTINUOUS SPECTRUMS OF LIGHT TUTORS, CONTINUUM TUTORS, CONDENSED MATTER PHYSICS TUTORS, ORBITAL MECHANICS TUTORS, GENERAL PLANS TUTORS, FLUID MECHANICS TUTORS, COMPOSITE MATERIALS TUTORS, MOLECULAR PHARMACOLOGY TUTORS, VIROLOGY TUTORS, CELESTIAL MECHANICS TUTORS, SOIL TYPES TUTORS, ATOMIC STRUCTURE TUTORS, CIVIL ENGINEERING TUTORS, PRINCIPLE OF WAVE MECHANICS TUTORS, CELESTIAL OBJECTS TUTORS, CONTIMUUM MECHANICS TUTORS, MECHANICS OF SOLID MATERIALS TUTORS, QUANTUM FIELD THEORY TUTORS, SOLID MECHANICS TUTORS, MECHANICS TUTORS, WAVE PROPOGATION TUTORS, SOIL TUTORS, NEWTONIAN MECHANICS TUTORS, APPLIED MECHANICS TUTORS, MOLECULAR MODELING TUTORS, ASTRONOMICAL OBJECTS TUTORS, OCEAN-ENVIRONMENTAL MECHANICS TUTORS, SOIL VAPOR EXTRACTION TUTORS, STRUCTURAL MECHANICS TUTORS, MATERIALS TUTORS, ENGINEERING MECHANICS TUTORS, CONDUCTIVITY TUTORS, MOLECULAR NEUROSCIENCE TUTORS, QUARK TUTORS, STATISTICAL MECHANICS TUTORS, NUMBER POWERS TUTORS, IMMUNOLOGY TUTORS, SAVILE WAVE TUTORS |

*Fig. 2a*

| SUBJECT | MATHEMATICAL CONTENT | LANGUAGE CONTENT |
| --- | --- | --- |
| ALGEBRA | 98 | 4 |
| GEOMETRY | 98 | 6 |
| CHEMISTRY | 63 | 32 |
| PHYSICS | 85 | 30 |
| ENGLISH | 1 | 99 |
| SPANISH | 1 | 99 |
| INTRODUCTION TO PHILOSOPHY | 25 | 80 |
| INTRODUCTION TO LOGIC | 70 | 50 |
| ACT TEST PREPARATION | 50 | 50 |
| SAT TEST PREPARATION | 50 | 50 |
| US HISTORY | 15 | 90 |
| WORLD HISTORY | 17 | 88 |

☒ ☐ John Doe   ☒ ☐ Top Five Quantum Physics Tutors   +
☐ Wyzant.com/Top_Five_Quantum_Physics_Tutors.aspx
○ Final Decisions   ○ Apps   ☐ Courts   ☐ Books Online   ○ Live, Version 6   ☐ Images   ☐ Patents   ☐ Smith VS. Brown   ☐ Report ◇Wyzant    SEE EXPERTS   SUCCESS STORIES   WHAT IT COSTS   BECOME A TUTOR    GET STARTED FOR FREE John Smith
Physics and Math tutor to help you reach your educational goals
ONLINE LESSONS
$55/hour  ★★★★★ 5.0 (792)
2,560 hours tutoring
SEE TUTORS LIKE THIS Robert Jones
Math/Physics/Computer Programming Help
ONLINE LESSONS
$40/hour  ★★★★★ 5.0 (83)
174 hours tutoring
SEE TUTORS LIKE THIS Jane Roberts
10 Years of experience. Lets reach your goals together!
ONLINE LESSONS
$24/hour  ★★★★★ 5.0 (59)
144 hours tutoring
SEE TUTORS LIKE THIS

SEE MORE TUTORS

TUTORS ▷ QUANTUM MECHANICS

Fig. 6d

Fig. 6f

AUTOMATED GENERATION OF RELATED SUBJECT MATTER FOOTER LINKS AND PREVIOUSLY ANSWERED QUESTIONS

CROSS REFERENCE TO RELATED APPLICATIONS

None.

FIELD OF THE DISCLOSURE

The present disclosure generally relates to a system and method for generating subject matter areas from a search query as well as uses for the automatically generated subject matter areas. More particularly, the present disclosure relates to a system and method for accepting a URL from an external search engine query and in response generating a collection of related subject matter areas and using them to populate footer links for a search engine facing web page. In addition, the present disclosure particularly relates to a system and method for accepting a question to pose to available tutors, and, based on the automatically generated subject matters related to that question, suggest a list of previously answered questions to the person posing the original question.

DESCRIPTION OF BACKGROUND

The purpose of a search engine is to parse a search string and return a list of results that are pertinent to the user's search, with the most relevant results appearing towards the top of the user's search and less pertinent results appearing afterwards. There are numerous types of search engines ranging from general engines, such as Google, to highly specialized search engines such as those that are adapted to identify specific numerical information or even search engines that are adapted to catalog chemical research.

Most consumers now begin searching for products and services on the web by using a Internet search engine, such as Google. A user will enter a search string, such as "quantum mechanics tutor," and the Internet search engine will return a list of relevant websites. The user will then browse through the returned sites, and potentially locate a site that fits her needs. Studies have shown that the first few sites that are listed in response to the search query receive a disproportionate amount of traffic related to that search string. In particular, studies have shown that the first page receives approximately ninety five percent (95%) of all search traffic, with the first listing receiving approximately nearly thirty percent (30%) of all search traffic. Accordingly, it is vital for most businesses to not only maintain an interesting website, but to ensure that the website ranks high with the major search engines with regards to important search queries.

General purpose Internet search engines, such as Google, maintain an extensive database of websites that it indexes against various search terms. Based on their databases, Internet search engines utilize proprietary algorithms to rank websites to appear in a certain order, with the most relevant website, as judged by the search engine algorithm, being given the first and most desired spot. While the search engines algorithms are not public, based on patent filings, and publicly released information, most, if not all, search engines appear to place the highest degree of emphasis on actual page content. Search engines also appear to place a great degree of emphasis on the content of pages that are linked to the subject page.

Certain sites on the Internet, such as expert matching sites, allow users to pose questions to experts. These questions are generally maintained so that users can search through them to see if a previous question is pertinent to them.

Document embedding algorithms are able to discern relationships between words by "studying" a large collection of related words. For example, the document embedding algorithm word2vec converts words to vectors, implemented as arrays of numbers, that have particular mathematical values. By using a multi-dimensional, such as a 100-dimensional, vector generated by the word2vec algorithm that has been trained on pertinent data, relationships, such as determining the "distance" between two words, which can provide information about how similar the words are based on the context provided by the training data.

OBJECTS OF THE DISCLOSED SYSTEM, METHOD, AND APPARATUS

Accordingly, it is an object of this disclosure to provide a tutor matching website that includes subject matter pages with footers including automatically generated related subject matter links.

Another object of the disclosure is to provide a tutor matching website with subject matter pages that includes automatically generated footer links to other internal subject matter pages.

Another object of the disclosure is to provide a tutor matching website that utilizes a document embedding algorithm to automatically generate footer links for use on subject matter pages of the website.

Another object of the disclosure is to provide a tutor matching website that allows a user to pose a question to tutors, and, based on the posed question, recommend previously answered questions to the user.

Another object of the disclosure is to provide a tutor matching website that utilizes a document embedding algorithm to automatically recommend previously answered questions to a user posing a question to a tutor.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, this disclosure details certain uses of a document embedding algorithm to improve the functioning of a tutor matching website. In a first embodiment, a method for automatically generating footer links for a subject matter web page of the tutor matching site is disclosed. The method comprises the steps of accepting a particular subject corresponding to the subject matter web page. A related subject matter algorithm is then executed on the particular subject to generate a list of at least one entry, with each entry identifying a particular related subject. Generally, the related subject matter algorithm will be a document embedding algorithm, such as word2vec, doc2vec or GloVe. A footer link is generated for every related subject in the list, and the footer links are then appended to the subject matter web page. Typically, the footer link will point to an internal web page, although in some cases an inactive link; i.e., text with no embedded hyper link content, may be used. The footer link can be appended to the footer portion of the subject matter web page in the order that it is processed, in alphabetical order, or in an order dictated by an index or score generated by the related subject matter algorithm.

In a second embodiment, a method for automatically generating a custom webpage including previously answered questions that are related to a question posed by a user is disclosed. The method comprises the steps of accepting a question from a user. The question is then parsed to determine a primary subject, and a blank custom answered question page is constructed. A related subject matter algorithm is then executed on the primary subject to generate a list of at least one entry, with each entry identifying a particular related subject. As with the prior embodiment, the related subject matter algorithm can be a document embedding algorithm, such as word2vec, doc2vec or GloVe. For each of the at least one entries, a collection of related previously answered questions are retrieved, and appended to the custom answered question page. The related subject matter algorithm can include with each entry in the list a relevance index, which can be used to append the previously answered questions to the custom answered question page in an order so that the questions corresponding to the most relevant related subject are appended to the top of the custom answered question page, and therefore are seen by the user first.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2a is a listing of subjects of learning that are related to an input subject.

Figure 6B:
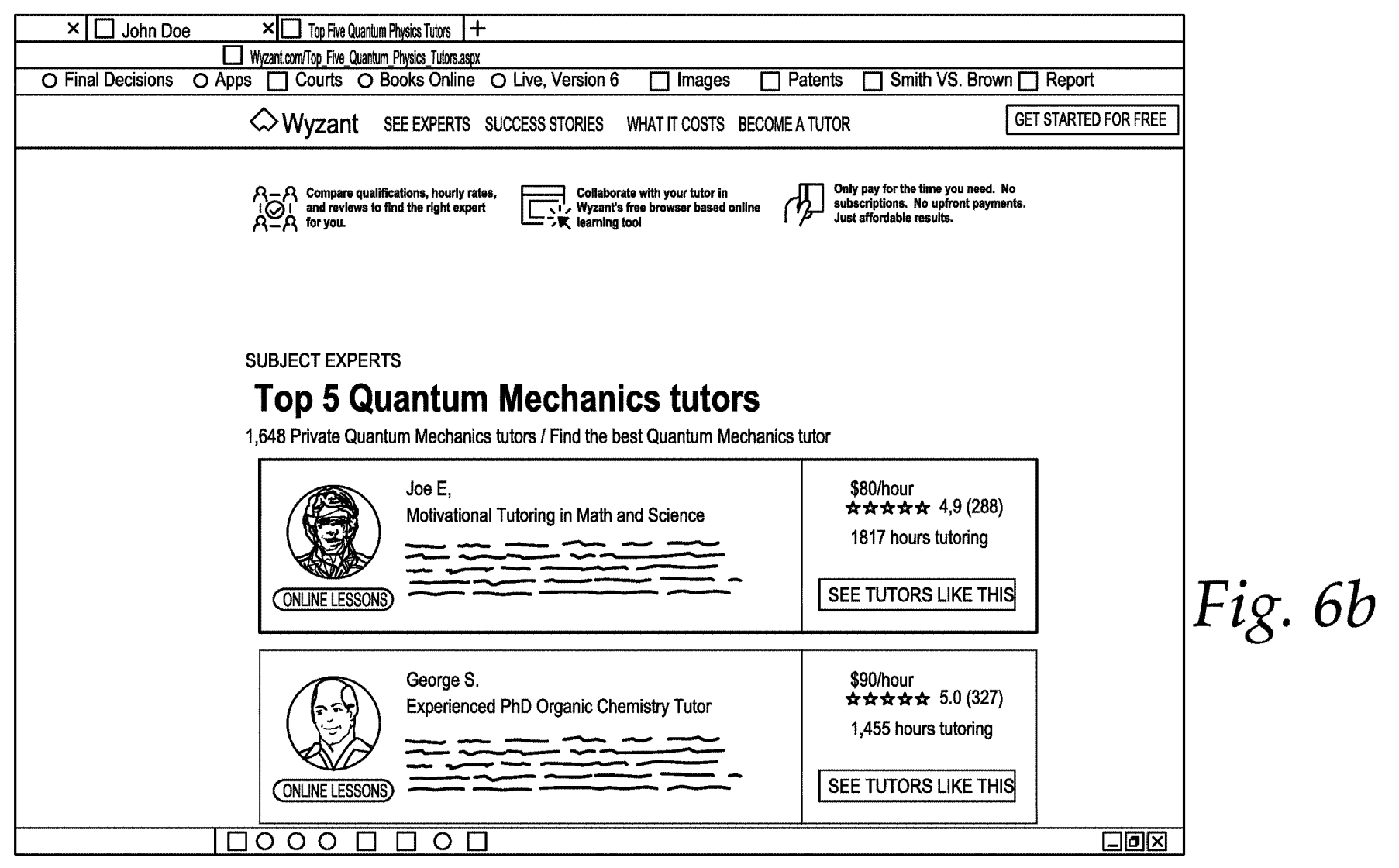
Figure 6D:
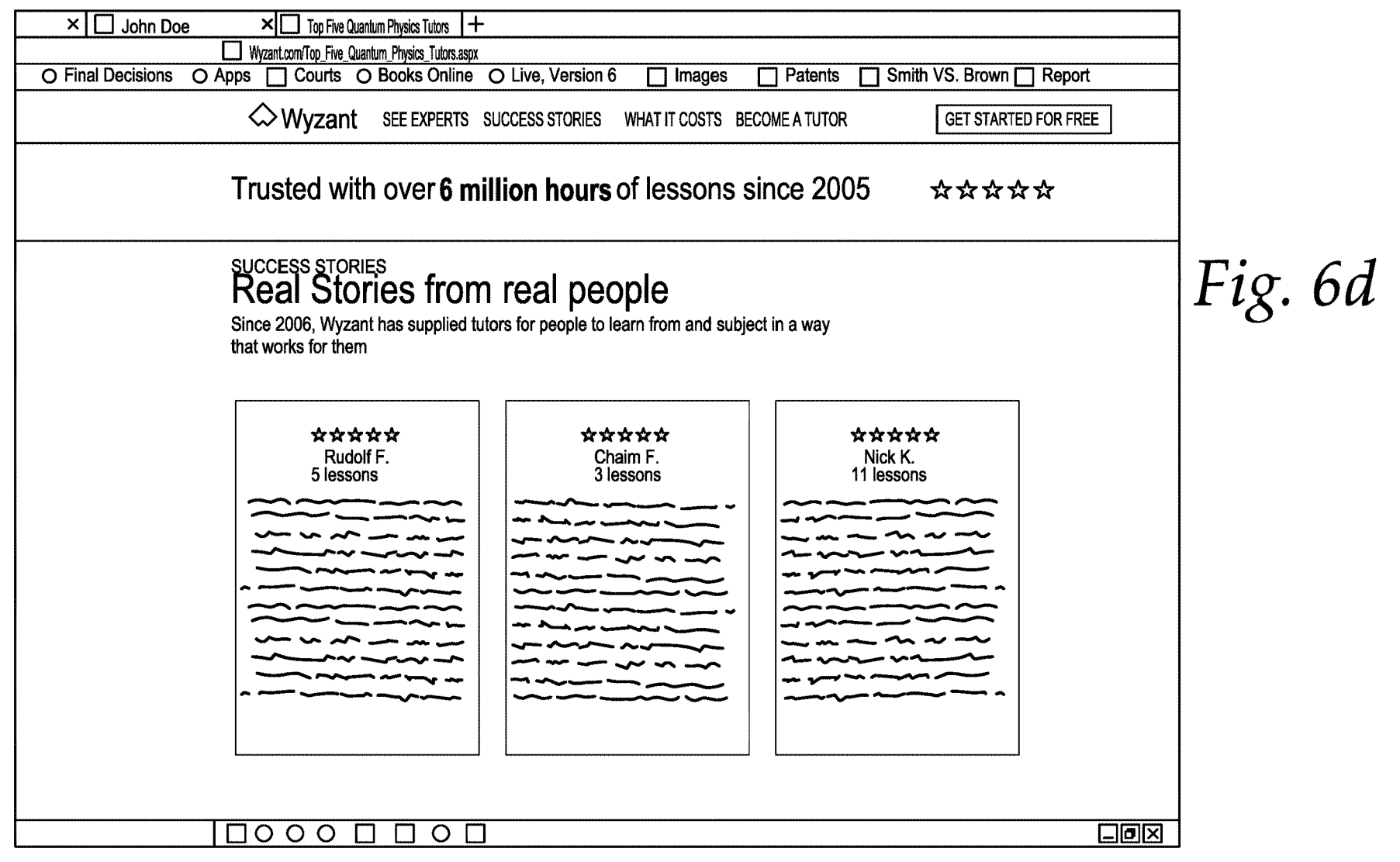
Figure 6F:
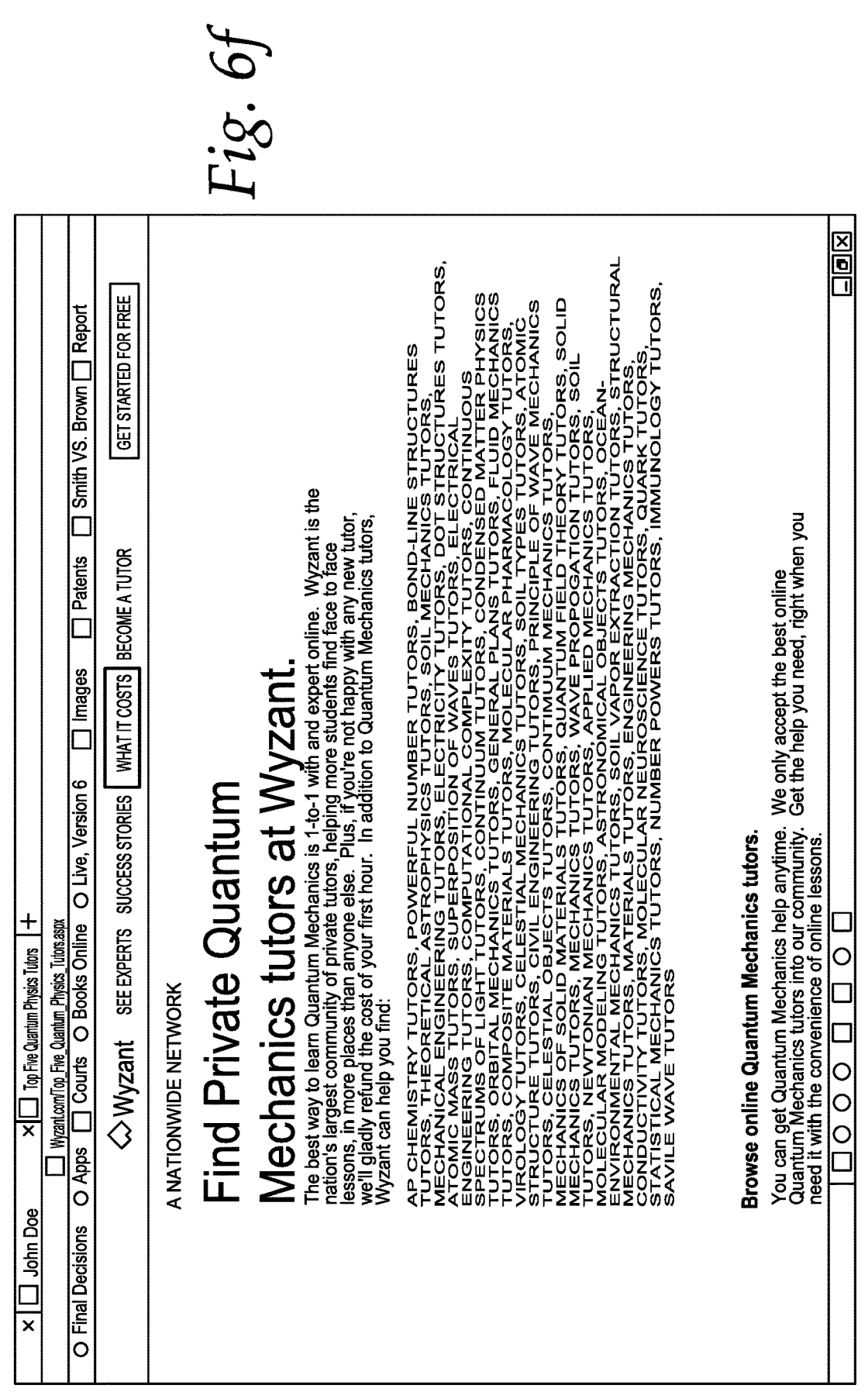

FIG. 6b is an image of a body part of a webpage generated by a system constructed in accordance with this disclosure.

FIG. 6c is an image of a body part of a webpage generated by a system constructed in accordance with this disclosure.

FIG. 6d is an image of a body part of a webpage generated by a system constructed in accordance with this disclosure.

FIG. 6e is an image of a body part of a webpage generated by a system constructed in accordance with this disclosure.

FIG. 6f is an image of a body part of a webpage generated by a system constructed in accordance with this disclosure.

Figure 1:
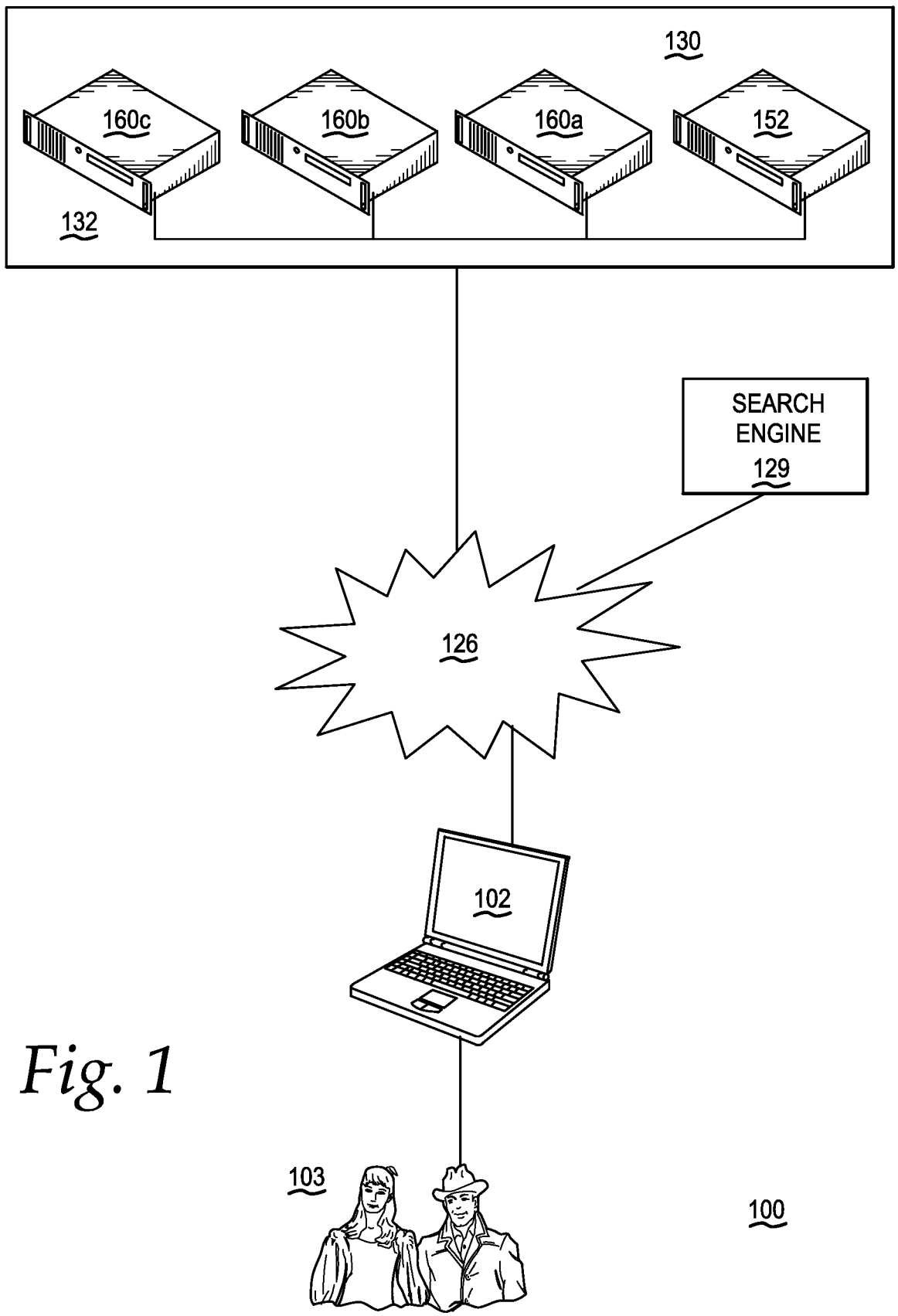
FIG. 1 is a simplified block diagram of a system for serving a tutor-matching website to Internet consumers.

A person of ordinary skills in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

This specification generally describes technologies related to developing a list of subjects related to a specific subject of learning, as well as using such technology to 1) develop a collection of footer links for a specific web page to improve SEO of that page, and 2) presenting a list of previously answered questions to a user who has posed a new question, where the subject matter of the new question is related to the subject matters of the previously answered questions. Specifically, the disclosed tutor matching website utilizes a document embedding algorithm, such as word2vec, doc2vec or GloVe, to develop a list of areas of learning that are related to a first subject matter from either a search engine search string or a question posed by a user. The related list of areas of learning are then used to populate footer links to improve SEO of a subject matter page related to the search string, or are used to recommend previously answered questions to a user based on a question that s/he is posing.

With regards to the generation of footer links, a list of search strings is generated using a prior art method. For example, a website designer could manually determine the most likely pertinent search strings that will be used. Alternatively, while Google no longer allows websites to determine what search strings resulted in traffic for their site, certain Internet search engines still allow this. In addition, Google and others allow Internet search engines to purchases advertisements for specific phrases, and the information provided by the Internet search engines to facilitate ad purchases can allow a web designer to programmatically determine the most important search strings for a web site. In reality, a combination of both methods, and perhaps other prior art methods, are used to determine a list of pertinent search strings.

Once the list of pertinent search strings are generated, a template is used to generate a complete webpage corresponding to the search string, such as that depicted in FIGS. 5a-5g. As part of creating a webpage from the template, a list of related subject matters are generated from the particular input search string. For example, when the string "Quantum Mechanics Tutor" is input to the related subject algorithm, it could output, among other subjects, "AP Chemistry Tutors," "Atomic Structure Tutors," and "Saville Wave Tutors." In this case, the related subject matter algorithm, which will typically be based on word2vec, doc2vec, GloVe, or similar, will be run at the time of website creation rather than in response to a user action.

With regards to the generation of a list of related previously answered questions, the user's question is first parsed and analyzed for a subject matter using a prior art method, and a subject is extracted from the question. For example, natural language processing could be used to extract the subject, or the user could select a subject from a list of possible subject when she submitted the question. The related subject matters algorithm is then executed on the extracted subject matter to generate a rank ordered list of related subjects. Based on the generated list of related subjects, a database of previously answered questions is accessed and the related previously answered questions are extracted and presented to the user in an ordered list.

A wide variety of document embedding algorithms can be used to accomplish the purposes of this disclosure. For example, word2vec, as outlined in the paper "Efficient Estimation of Word Representations in Vector Space," by Mikolov, Corrado, Chen, and Dean, all of Google Inc., which was published on or about Sep. 7, 2013, and which is hereby incorporated by reference in the entirety, is one such algorithm. Another suitable algorithm would be doc2vec, as outlined in the paper "Distributed Representations of Sentences and Documents," by Le and Mikolov, both of Google, Inc., which was published in the Proceedings of the $31^{st}$ International Conference on Machine Learning in 2014, which is hereby incorporated by reference in the entirety. Yet another suitable algorithm would be "GloVe: Global Vectors for Word Representation," by Pennington, Socher & Manning, all of Stanford University Computer Science Department, published in the Proceedings of the 2014 Conference on Empirical Methods in Natural Language Processing on or about Oct. 25, 2014, and which is also hereby incorporated by reference in the entirety.

With regards to these algorithms, they are trained on a set of sample data, which could be, for example, material on the different subjects that the algorithm is expected to determine relations among. For example, the algorithm could be trained on a collection of text books, white papers, test questions, study guides, and student notes across the subjects of concern. Based on this training material, the algorithms determine vector representations for the input subjects. Mathematical operations, such as determining the Euclidean distance between the vector representations, can help to determine whether the subjects are related or not.

Turning to the Figures, and to FIG. 1 in particular, a block diagram illustrating an architecture for implementing a system to provide a tutor matching system to a user. The system 100 includes a computer 102 that may be used by a user 103 interacting directly with the computer 102 through a display screen and various input devices, including, for example, a touch screen, a keyboard and mouse, etc. It should be noted that the term computer 102 used herein is used broadly, and can refer to any kind of client computer, including a desktop, laptop, smartphone, tablet, etc. In addition, while the computer 102 is described as having a display screen, that is not a necessary feature of the disclosed system and method, which can be implemented using, for example, a computer without a screen, such as a smart speaker. Computer 102 can include a web browser, or an application specific interface allowing it to utilize the disclosed system and method.

As illustrated in FIG. 1, a front-end server 152 is coupled to the computer 102 through a network 126. It should be noted that that the front-end web server 152 and all other servers mentioned herein can be implemented as a collection of cloud servers, or as an actual, specific server. In addition, any of the servers referred to herein can be implemented as a virtual server. Typically, the user 103 will direct a search inquiry to a search engine 129 using the computer 102 and the network 126. The search engine will return a list of resultant websites. For example, the user 103 could enter "quantum mechanics tutor" as a search string, and search engine 129 will return a list of websites that are relevant to quantum mechanics tutors.

With regards to this disclosure, one of the returned websites will be a tutor matching website served by the front-end web server 152. The front-end server 152 receives requests from computer 102 or other client devices. Typically, a request is received by a front-end server 152, and passed to a back-end server 160a-c which will assemble a web page, which is then passed back to the requesting computer 102 by a front-end server 152 or a different server.

Each of the servers 152, 160a, 160b, 160c can include an electronic computing device operable to receive, transmit, process, store, or manage data and information associated with the website serving system 130. The servers can each include one or more processors capable of executing programs, performing data manipulations and controlling tasks on the server. The servers will also generally include memory, such as dynamic random-access memory (DRAM), and storage, such as rotating magnetic disc storage, solid state disc storage, or some other type of storage. The servers will generally also include a network interface, such as, for example, an ethernet port, an 802.11 interface, etc.

The network 126 can be the Internet, a local area network (LAN), a wide area network (WAN), or any other network or combination thereof. Similarly, a network of any type 132 couples the servers 152, 160a, 160b, 160c to one another. Typically, with regards to this disclosure, the network 126 will be the Internet, with the network 132 being a high-speed local area network, such as high-speed Ethernet.

Typically, one or more servers 152, 160a, 160b, 160c contain logic for implementing the website functionality disclosed herein. For example, one of the servers 160a, 160b, 160c can implement the related subject matter algorithm discussed herein. While the related subject matter algorithm is described as being implemented on a single server 160a, it can also be distributed across multiple servers within the website serving system 130.

Figure 2:
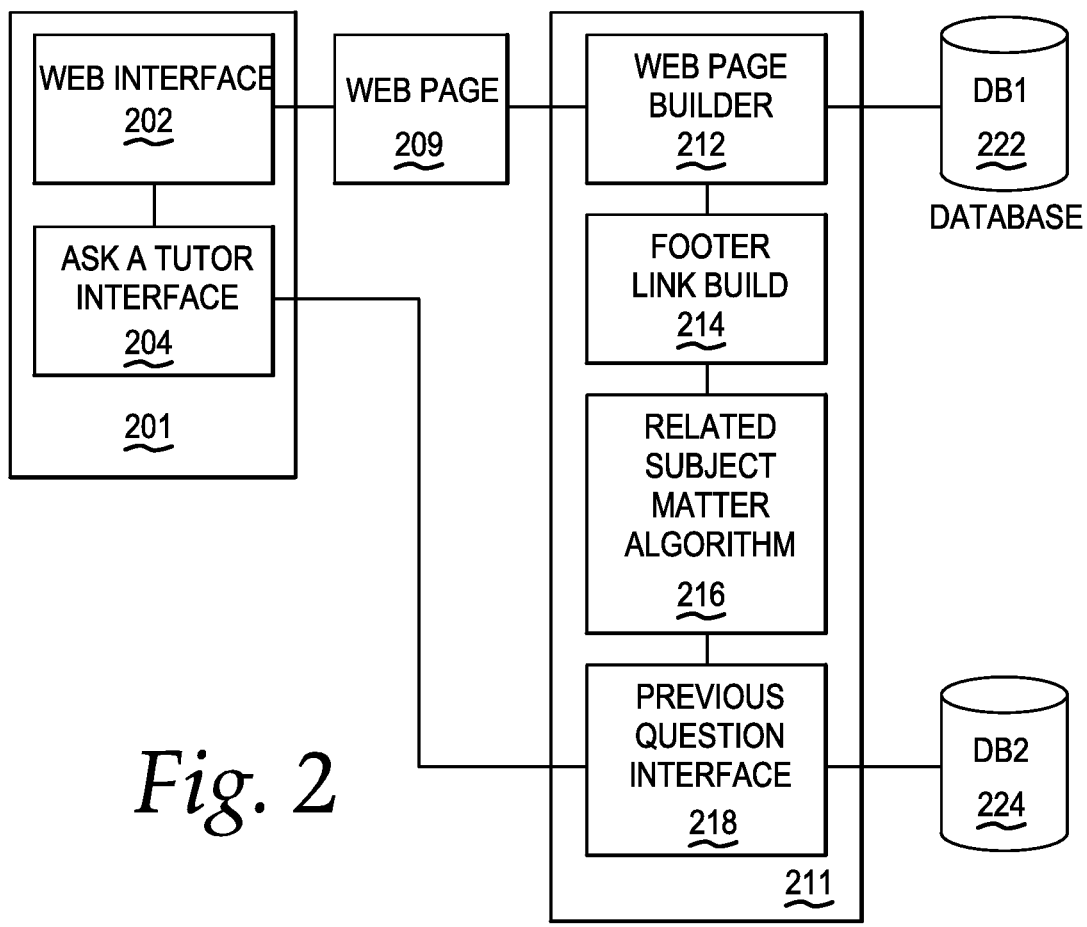
FIG. 2 is a software block diagram illustrating a system for serving a tutor-matching website to Internet consumers.

Turning to FIG. 2, a software block diagram illustrating the various components of the disclosed tutor matching system is illustrated. It should be noted that while certain components are ascribed to certain servers; i.e., front-end or back-end, any of the software components can function on any of the servers.

The software modules are generally split into two portions; front-end software 201 that will typically operate on a front-end server 152 and back-end software 211 that will typically operate on a back-end server 160a, 160b, or 160c. The front-end software 201 includes a web interface component 202. The web interface component 202 will provide a web interface, such as a web based graphical user interface, to a web browser operated by a user 103. In particular, the content of the presented web page will correspond to the page returned by the search engine 129. The front-end software 201 also includes an ask a tutor interface 204. The ask a tutor interface presents a user 103 with a web interface allowing the user to ask a question to a tutor that operates via the tutor matching site.

The back-end software 211 includes a web page builder 212. The web page builder 212 builds a web page based on static content that is stored in the first database 222 (the web site database) as well as dynamic content based on the user's selections for the particular page. It should be noted that the first database 222 includes both subject matter-based pages, as well as other pages. In certain cases, the first page presented to a user can be entirely static content, with later pages being partially or entirely comprised of dynamic content. The back-end software 211 also includes a footer link builder 214, which will build a set of footer links for a particular subject matter-based page. The footer link builder 214 will generally be run as a preprocessing step; i.e., prior to the particular page being requested a user 103. Accordingly, the footer links will be stored along with the rest of a particular subject-matter page in the first database 222.

The footer links will be based partially on the output of the related subject matter algorithm 216. The related subject matter algorithm 216 will accept an input subject of learning and find related subjects of learning. For example, for an input of "quantum mechanics tutors," one embodiment of the related subject matter subject algorithm 216b can produce the list of related subjects shown in FIG. 2a.

Figure 3:
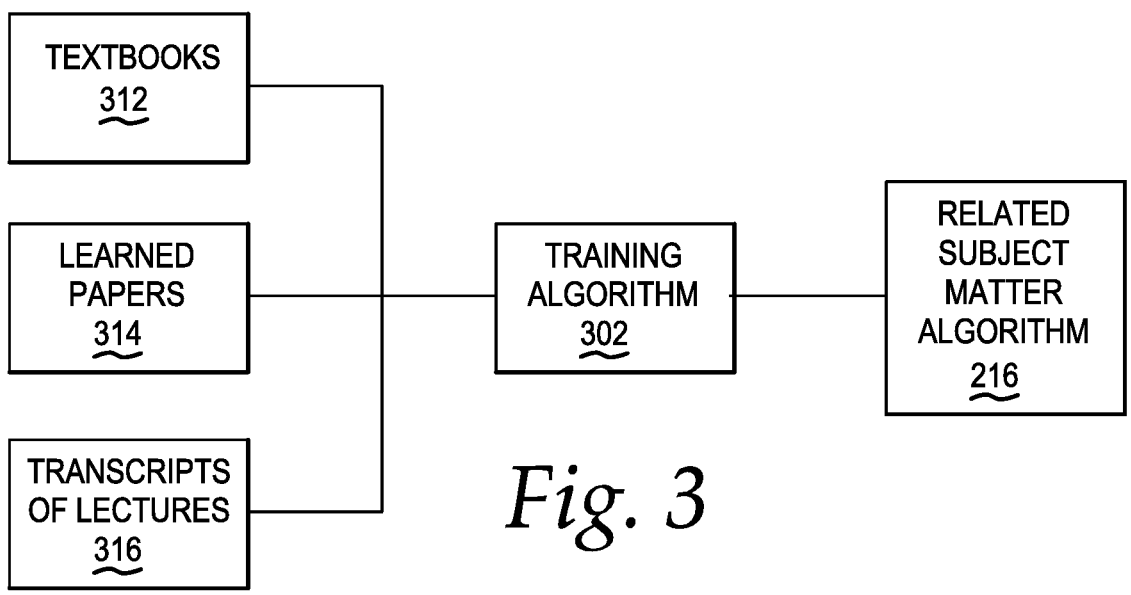
FIG. 3 illustrates how the related subject matter algorithm can be trained in accordance with disclosure.

Turning to FIG. 3, the related subject matter algorithm 216 is discussed in more detail. In particular, document embedding algorithms require training, which generally means that a large amount of material is fed into the algorithm so the algorithm can determine relationships. In accordance with this disclosure, the related subject matter algorithm 216 can be trained with a variety of material, such as, for example, text books 312 related to the pertinent subject matter, learned papers 314 related to the pertinent subject matter, and transcripts of lectures related to the pertinent subject matter 316. These materials are fed into a training algorithm 302, which creates relationships used by the related subject matter algorithm 216. By training the related subject matter algorithm 216 with a sufficient amount of pertinent information, a sufficient amount of multi-dimensional information can be gathered on the different subjects, so that comparisons can be made among the analyzed terms.

Figures 4, 5:
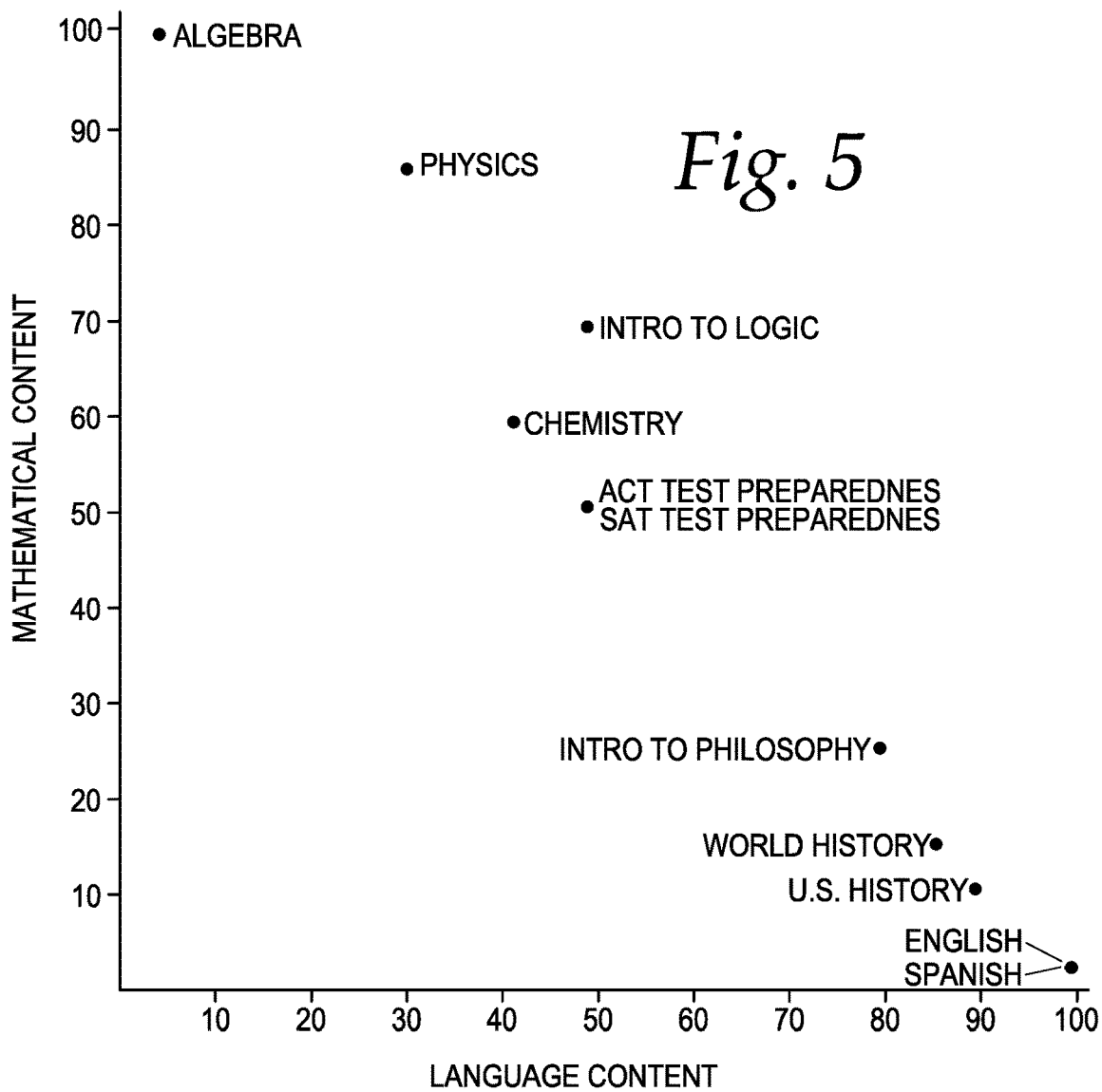
FIG. 4 is a two-dimensional table illustrating a much-simplified mathematical vector representation of a number of subjects of learning.
FIG. 5 is a scatter diagram illustrating a two-dimensional plot of the vector representations of the table of FIG. 3.
Figure 6A:
FIG. 6a is an image of the header of a webpage generated by a system constructed in accordance with this disclosure.
Figure 6G:
FIG. 6g is an image of the footer of a webpage generated by a system constructed in accordance with this disclosure.

The techniques for making comparisons using multi-dimensional vector information produced by training a document embedding algorithm are well-known. However, they are explained with reference to FIGS. 4 and 5 in a simplistic manner. FIG. 4 is a table illustrating a much-simplified mathematical vector representation of a number of subjects of learning. In particular, the table assigns measures of "Mathematical Content" and "Language Content" to ten different subjects of learning. It should be understood that the output of a document embedding algorithm will likely have many more dimensions, perhaps one-hundred or more, than the two demonstrated here. However, two is used for purposes of simple illustration.

FIG. 5 shows the subject-matter vectors of FIG. 4 graphed in a scatter-diagram so that relationships between the subjects can be more easily understood. For example, by looking at the scatter-diagram, it is readily apparent that English is similar to Spanish, and that ACT Test Preparation is similar to SAT Test Preparation. In addition, it is clear that Geometry and Algebra are related subjects. Perhaps most interestingly, this diagram demonstrates that based on the tracked information, Intro to Logic and Chemistry are related, and Intro to Philosophy is related to both World History and US History.

While those relationships were determined by visual inspection, one way to determine whether a relationship exists between two subjects is to determine the Euclidean Distance between the data vectors. In two dimensions, this calculation can be expressed as follows:

$$d=\sqrt{(x_1-x_2)^2+(y_1-y_2)^2}$$

This calculation can trivially scale to any number of dimensions as is known in the art. Once the distance is computed, it can be compared to a cutoff distance to determine whether or not a relationship exists. Alternatively, the inverse of the distance can be used to determine the strength of the relationship; i.e., a strong relationship would exist between Algebra and Geometry, a moderate relationship would exist between Algebra and ACT Test Preparation, and a very weak relationship would exist between Algebra and Spanish.

FIGS. 6a-6g illustrate a sample web page constructed in accordance with this disclosure. As illustrated, the top of the page shows the particular subject matter, with the top subject matter tutors being presented in the next section (as the viewer transitions down the page), followed by a customer story section, and a section advertising the typical tutoring packages offered by the website operator. At the very end are a collection of footer links. The links are generated in accordance with the algorithm of FIG. 7.

Figure 7:
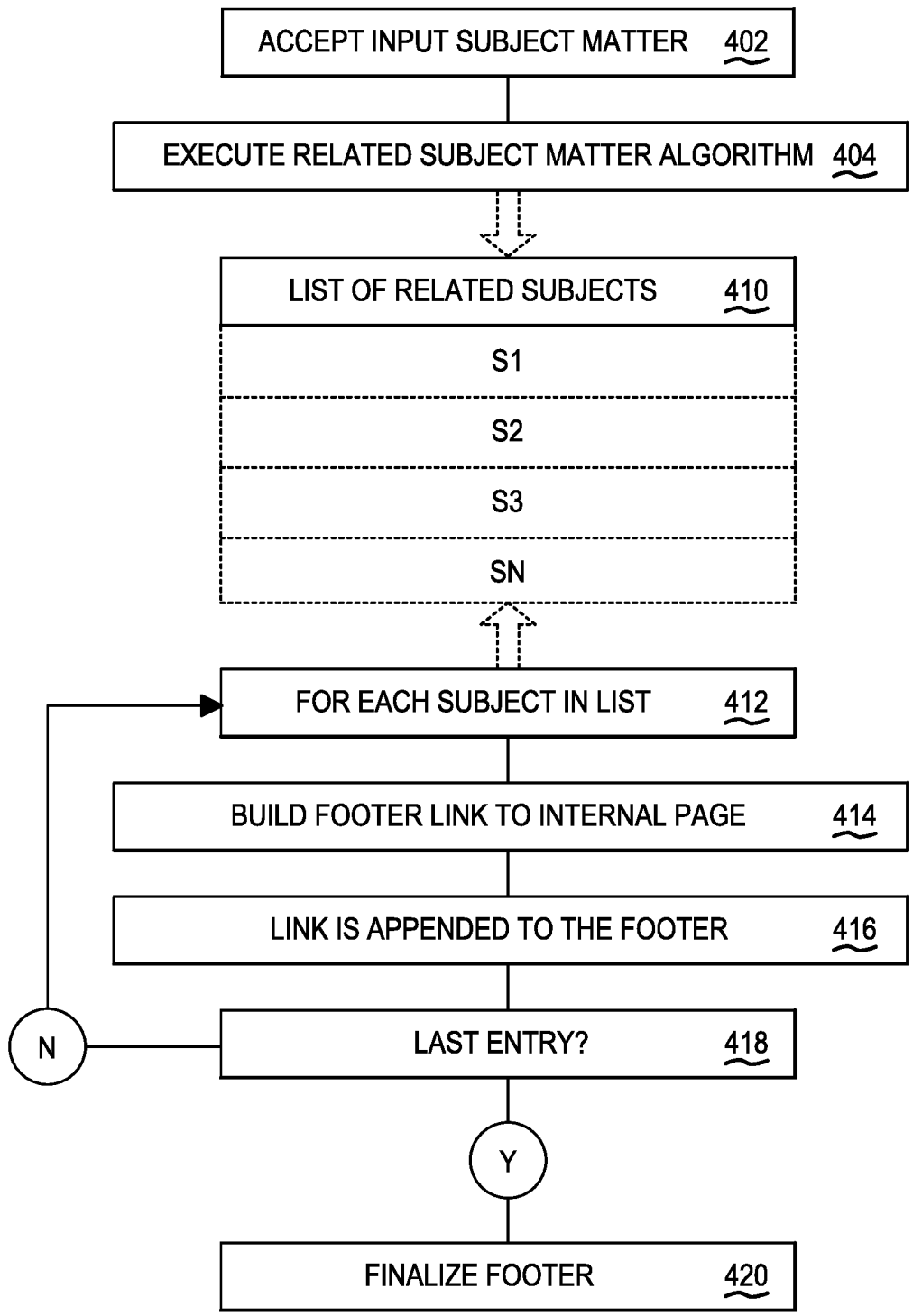
FIG. 7 is a flowchart for generating a list of footer links comprising related subject matters from an input subject matter.

Turning to FIG. 7, a flowchart for generating a collection of footer links for a subject matter page for the disclosed tutor matching site is illustrated, wherein each of the footer links is an internal webpage link to another subject matter page. The algorithm disclosed in FIG. 7 is intended to be run as a preprocessing step; i.e., at the time that a particular web page is built, rather than when it is accessed by a user. In a first step 402 an input subject matter is accepted. For example, when constructing the footer links for the subject matter page related to "quantum mechanics," the subject "quantum mechanics" would be input in step 402. In step 404, the related subject matter algorithm is executed to generate a list of related subjects 410. For example, when the subject "quantum mechanics" is input to the related subject matter algorithm in step 404, it would generate the list of subjects shown in FIG. 2a.

In step 412, the entire list of subjects is iterated through. In particular, in step 414, a footer link corresponding to the subject will be created. The footer link can, for example, be created as a string or string object. Generally, the footer link will link to an internal subject matter page that corresponds to the subject of the footer link; for example, for the related subject "statistical mechanics," a link will be created to the internal page corresponding to "statistical mechanics." In certain embodiments of the disclosed system and method, the list of related subjects 410 may contain a subject for which no existing internal page exists. In such a case, an inactive link, such as plain text, will be inserted, or the subject may be entirely omitted from the footer.

In step 416, the link is appended to the footer. The link can be appended in any order, including the order processed, alphabetical order, or based on a relatedness index returned by the related subject matter algorithm and stored in the list 410. Execution then proceeds to step 418, where a check is made to determine if the list entry that was recently processed is the last list entry. If not, execution returns to step 412, where the next list entry is retrieved. On the other hand, if the prior list entry was the last list entry, then execution proceeds to step 420, where the footer is finalized. In step 420, the footer can be appended to the actual subject matter web page, or that can be done as part of a different process.

Figure 8:
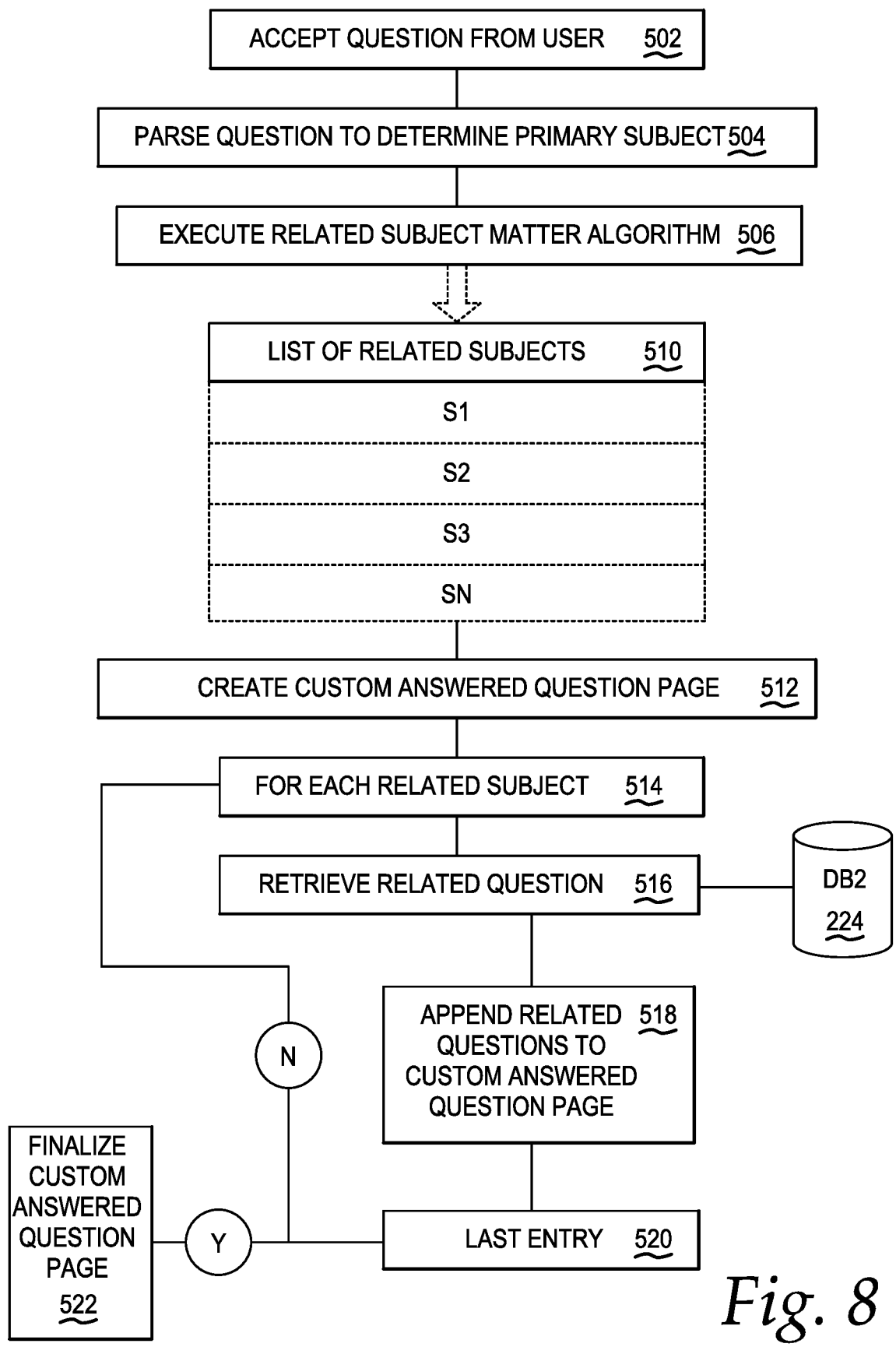
FIG. 8 is a flowchart illustrating the generation of suggested past questions based on a question posed by a user.

The disclosed tutor matching websites also allows users to pose questions to tutors, who can answer the question if they choose. This allows the tutor to demonstrate her expertise and perhaps attract a new student. When questions are answered, they are presented to the user who posed the question, and maintained in a database that can be searched by other users who are looking for answers to questions. In addition, this disclosure presents a method by which past questions can be referred to users poising new questions in a way that can be useful to the users. This method is illustrated in FIG. 8.

Starting in step 502, a question is accepted from a user. The method by which the question is referred to particular tutors is not the subject of this disclosure, and is not discussed further. However, in step 504, the question is parsed to determine a primary subject. The step of parsing the question to determine the subject can include, for example, accepting a selected subject from the user or by using a natural language processing algorithm to determine the most applicable subject. Once the primary subject is determined, the related subject matter algorithm is executed in step 506, which produces a list of related subjects 510. In step 512, a custom answered question page is created to display to the user. Then, in step 514, the list of related subjects 510 is iterated through. In step 516, questions related to the present subject are retrieved from the database 224. In step 518, the related questions are appended to the custom answered questions page. Preferably, the related questions are appended to the custom answered question page based on a relevance index, so the most important related questions are appended to the custom answered question page at the top (so they are seen first by the user), with less related questions being appended later. In step 520, a check is made to determine if the present list entry is the last in the list of related subjects 510. If the present list entry is not last entry in the list, execution returns to step 514. On the other hand, if the present list entry is the last entry in the list, execution transitions to step 522, where the custom answered question page is finalized and presented to the user.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer-implemented method for use with a tutor matching website, the method generating footer links for a subject matter webpage, the subject matter webpage being associated with a particular subject, the method performed by at least one processor comprising the steps of:

accepting the particular subject;

executing a related subject matter algorithm on the particular subject to generate a list of related subjects, the list comprising at least one entry identifying a related subject with a strong relationship to the particular subject, wherein the related subject matter algorithm utilizes a training algorithm for identifying the strong relationship to the particular subject;

iterating through the list comprising at least one entry and executing the related subject matter algorithm on each member of the list to generate a second list of at least one entry identifying a related subject with a strong relationship to the subject of the at least one entry, wherein the related subject matter algorithm utilizes the training algorithm for identifying the strong relationship to the subject of the at least one entry based on distance computations between the related subject and the subject of the at least one entry using multi-dimensional information;

generating a plurality of footer links corresponding to at least some of the at least one entry and the second list of at least one entry, with the each footer link corresponding to the related subject of the particular list entry; and appending the plurality of footer links to a footer of the subject matter webpage.

2. The method of claim 1 wherein at least one footer link points to an internal webpage.

3. The method of claim 1 wherein at least one footer link is an inactive link.

4. The method of claim 1 wherein at least one footer link is appended to the footer of the subject matter webpage in the order that it was processed.

5. The method of claim 1 wherein at least one footer link is appended to the footer of the subject matter webpage in an alphabetical order.

6. The method of claim 1 wherein at least one footer link is appended to the footer of the subject matter webpage in an order based on a relatedness index returned by the related subject matter algorithm.

7. The method of claim 1 wherein the related subject matter algorithm is a document embedding algorithm.

8. The method of claim 7 wherein the related subject matter algorithm is selected from the group consisting of word2vec, doc2vec or GloVe.

9. A computer-implemented method for use with a tutor matching website, the method generating a list of previously answered related questions in response to a user entering a new question, the new question being associated with a particular subject, the method performed by at least one processor comprising the steps of:

accepting the new question;

constructing a custom answered question page;

parsing the question to determine a primary subject;

executing a related subject matter algorithm on the particular subject to generate a list of related subjects, the list comprising at least one entry identifying a related subject, wherein the related subject matter algorithm utilizes a training algorithm to determine relationships among the related subjects used to create the list of the related subjects, wherein the related subject matter algorithm utilizes the training algorithm for identifying the relationships among the related subjects based on distance computations between the related subjects and the particular subject using the multi-dimensional information;

retrieving one or more previously answered questions corresponding to the related subject;

appending the one or more previously answered questions to the custom answered question page; and determining if the present list entry is the last in the list of related subjects;

iterating through the list of related subjects;

determining the present list entry is the last list of related subjects; and presenting a custom answered questions page to the user for the present list entry which is the last in the list of related subjects.

10. The method of claim 9 wherein the step of executing generates a relevance index for the at least one entry identifying a related subject, and wherein the step of appending utilizes the relevance index when appending the one or more previously answered questions to the custom answered question page so that the previously questions corresponding to a most relevant subject are placed at a top portion of the custom answered question page.

11. The method of claim 9 wherein the related subject matter algorithm is a document embedding algorithm.

12. The method of claim 11 wherein the related subject matter algorithm is selected from the group consisting of word2vec, doc2vec or GloVe.

* * * * *